March 29, 1932.  M. H. ACKERMAN  1,851,076
SEAL RING
Filed Aug. 2, 1928  2 Sheets-Sheet 1

M. H. Ackerman, Inventor
By C. A. Snow & Co.
Attorneys

March 29, 1932.　　　M. H. ACKERMAN　　　1,851,076
SEAL RING
Filed Aug. 2, 1928　　　2 Sheets-Sheet 2
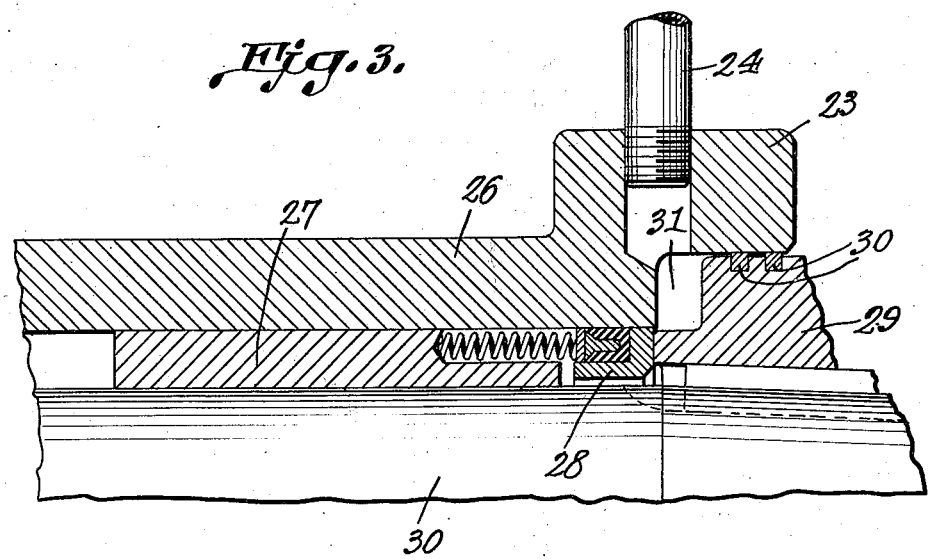
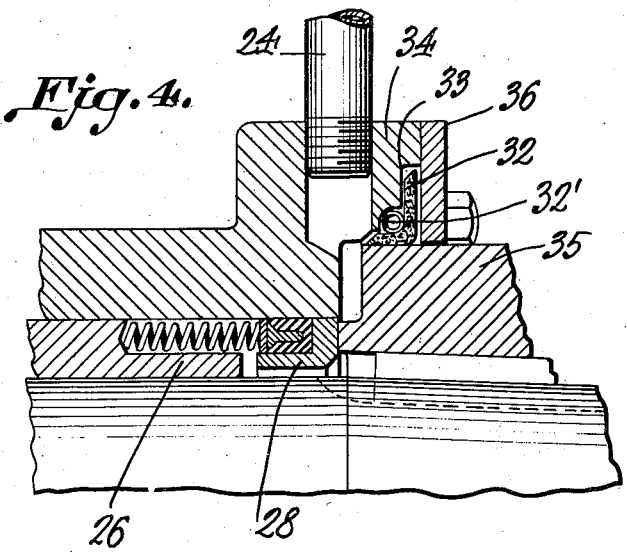
M. H. Ackerman, Inventor
By C. A. Snow & Co.
Attorneys Patented Mar. 29, 1932

1,851,076

UNITED STATES PATENT OFFICE

MICHAEL HENRY ACKERMAN, OF MANSFIELD, OHIO, ASSIGNOR OF ONE-HALF TO LOUIS C. SICKEL, OF CALEDONIA, OHIO

SEAL RING

Application filed August 2, 1928. Serial No. 297,056.

This invention relates to a composite seal ring and constitutes an improvement upon the structures disclosed in my copending applications filed January 28, 1928, Serial Number 250,224 and May 2nd, 1928, Serial Number 274,586.

One of the objects of the invention is to provide a seal ring carried by the bushing forming a part of the shaft bearing, said bushing being formed with the necessary recess for the reception of the seal ring.

A further object is to provide improved means whereby pressure from within the compressor or the like with which the seal ring is used can be directed back of the ring to maintain a tight connection between the seal ring and the working element cooperating therewith.

Another object is to provide an emergency outlet for the bearing whereby any gases that might leak from any cause through the bearing, can be conducted to a point outside the building so that no harmful effects will result, this feature being particularly desirable in meat markets, restaurants, etc. where leakage of ammonia from refrigerating apparatus always interferes seriously with business.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred forms of the invention have been shown.

In said drawings,

Figure 3 is a section through a portion of a different form of ring.

Figure 4 is a similar view showing another form of blowout resistance combined with the seal ring illustrated in Figure 3.

Figure 1:
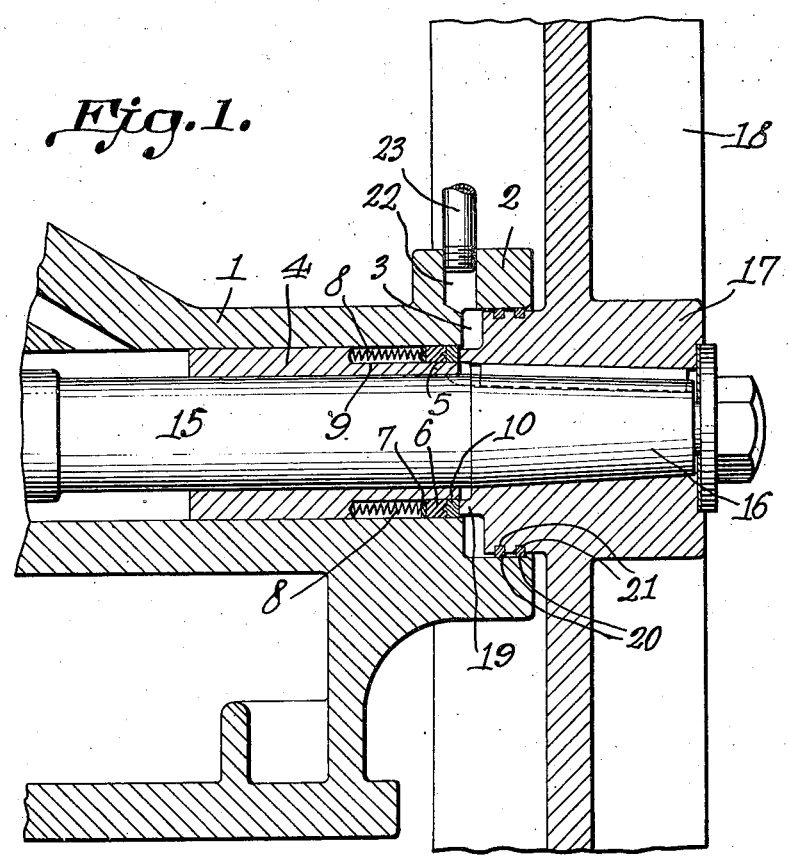
Figure 1 is a section through the improved seal ring and adjacent parts.

Referring to the figures by characters of reference 1 designates a portion of the crank case housing of a compressor, the outer end thereof being formed with an annular guard flange 2 defining a recess 3. A bushing 4 is seated in the housing 1 and has a tight fit, this bushing being formed, in its outer end, with an annular groove 5 in which is seated a packing ring 6 of rubber or other suitable resilient material. The inner face of this ring is engaged by a washer 7 against which thrust coiled springs 8 seated in recesses 9 formed in the bushing and opening through the outer surface thereof. A ring 10, preferably of steel, is seated in the outer portion of recess or groove 5 and bears against the outer surface of the ring 6, suitable projections 11 being formed on the ring 10 for engaging ring 6 to assist in making a gas tight joint if so desired.

A groove 12 is formed in the inner surface of the bushing for conducting lubricant to an annular groove 13 also formed in the bushing and from this annular groove small ports 14 lead to the respective recesses 9.

Figure 2:
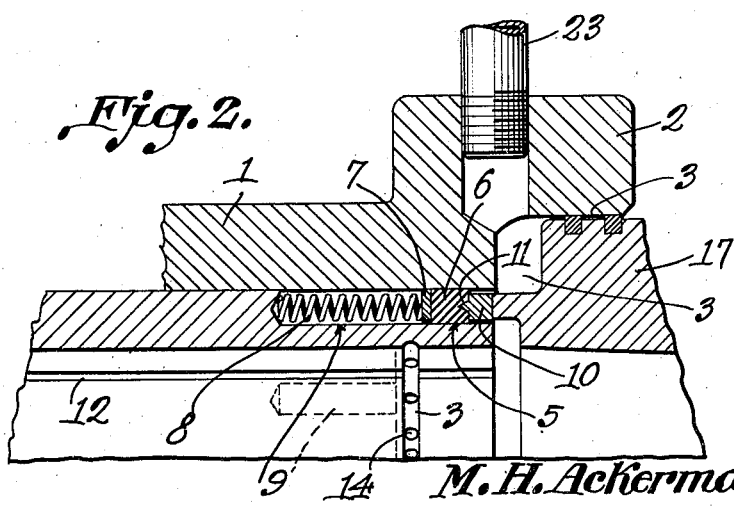
Figure 2 is an enlarged section through a portion of the ring and adjacent parts.

In the structure illustrated in Figures 1 and 2 one end of a shaft 15 is journaled in the bushing 4 and has its tapered terminal portion 16 detachably engaged by the hub 17 of a wheel 18.

One end of the hub portion 17 is formed with a concentric bearing flange 19 so proportioned and located that, when the parts are properly assembled, it will have a tight working fit against the ring 10. The hub portion 17 extends into the recess 3 and a sealed connection is provided between the hub and the flange 2 by expansible metal sealing rings 20 which bind tightly against the inner periphery of the flange 2 (which is the wall of the recess 3) and extend into annular grooves 21 formed in the hub. Thus an annular chamber is formed by recess 3 between the rotatable portion or hub 17 and the member 1 and around the inner end of the said hub.

One or more vent ports 22 are provided within the flange 2 and communicate with the space 3 between the hub 17 and the housing 1. A vent pipe 23 is employed for conducting gas from the space or recess 3 through the port or ports 22 to the atmosphere outside of the room in which the compressor is located, thereby to provide controllable means for the escape of gas trapped around the inner end of the hub 17 and within recess or chamber 3.

In practice the seal ring is assembled with the bushing 4 after said bushing has been assembled with the housing and thereafter the wheel hub 17 is placed in position and tightened. The seal ring, cooperating with the flange 19 will form a tight connection designed to prevent leakage of gas under pressure from the space surrounded by flange 19. If, however, there should be any such leakage resulting from any cause, the gas will enter the space between hub 17 and housing 1 where it will be restrained by the rings 20. Consequently instead of escaping around the hub, the gas will be trapped and follow the course of least resistance, flowing outwardly through the pipe 23 to a point where it can be delivered into the atmosphere without producing the objectionable results occurring should there be a leakage at the bearing.

Although the vent pipe 23 has been shown in combination with a structure utilizing the particular form of seal ring illustrated in Figures 1 and 2 it is to be understood that it can be employed in connection with other forms of bearings, mechanical sealing devices, stuffing boxes, etc. wherever there is likely to be accidental leakage of gas and it is desired to conduct the gas to an outside or remote point. In Figure 3 the vent pipe 24 is shown extended from the flange 25 of a housing 26 in which is seated a bushing 27. The seal ring 28 is supported in the housing beyond the bushing and is similar to the one disclosed, for example, in my application 250,224. The hub 29 of the wheel mounted on shaft 30 is provided with expansible sealing rings 30 like the rings 20 and which serve to prevent leakage of gas from recess 31 should it escape past the sealing ring 28. This structure, illustrated in Figure 3, is designed primarily to show an application of the safety pipe to a sealing structure of the same general type as that shown in my copending cases.

It might be stated that, instead of using expansible rings such as shown at 20 and 30, it may be possible, under some conditions, to mount a packing ring 32 in a recess 33 formed in the flange 34. This packing will extend around and fit snugly against the hub 35 and can be held assembled with flange 34 by a retaining ring 36. A circular coiled spring 32' can be used for holding the packing ring tight enough to rotate with hub 35 should gas escape through the packing or joint of seal 28. The velocity of these gases passing through the restricted outlet at 33 will force the lip of the cup leather 32 against the retainer ring 36 making a gas tight joint temporarily during the period the escaping gases have sufficient velocity. The design and assembly of ring 32 is such that it will slip into a neutral position when the shaft is rotated without a frictional rotating contact on the hub 34 or the ring 36.

What is claimed is:

1. The combination with a rotatable shaft and a bearing structure through which it extends, the outer end of said structure being recessed, of a sealing ring within said structure surrounding the shaft, a member rotatable with the shaft and extending into the recess, said member having a working fit upon the sealing ring, a sealing working connection between said rotatable member and the recessed outer end of the bearing structure thereby to provide an annular chamber for trapping gas leaking past the sealing ring, and means for controlling the leakage of gases, including means for conveying leaking gases from the recess to a point remote from the bearing structure.

2. The combination with a rotatable shaft and a housing through which it extends, of a bushing for the shaft in the housing, a compressible ring extending around the bushing and between the bushing and the housing, a bearing ring engaging the outer side of the compressible ring, a member rotatable with the shaft, means carried by the bushing for pressing the compressible ring against the bearing ring to expand it against the housing and bushing and in running contact with said member, said bushing extending through the rings, and means for conducting to a point remote from the housing gases escaping past the sealing ring, thereby to control leakage.

3. The combination with a bearing structure, a bushing therein and a shaft journaled in the bushing, of a compressible ring seated in the bearing structure, a bearing ring engaging the outer surface thereof, one end of the bushing being extended through the rings, springs seated in the bushing, a member rotatable with the shaft, means for transmitting thrust from the springs to the compressible ring to expand the same into sealing contact with the bearing structure and the bushing, and hold the bearing ring in sealing contact with said member, means on the bearing structure cooperating with the member on the shaft, to provide an annular space for receiving gases leaking past the bearing ring, means on the bearing structure and the shaft member for sealing said space against the escape of gas between said structure and member, and a pipe for conducting gases from said space to a point remote from the bearing structure.

4. The combination with a rotatable shaft and a bearing structure through which it extends, one end of said structure being recessed, of a sealing ring within said structure surrounding the shaft, a member on the shaft and in the recess, said member having a working fit against the sealing ring, a sealing working connection between said member and the recessed outer end of the bearing structure thereby to provide an annular chamber for trapping gas leaking past the sealing ring, and means for controlling the leakage of gases including means for conveying leaking gases from the recess to a point remote from the bearing structure.

In testimony that I claim the foregoing as my own, I have hereto affixed my signature.

MICHAEL HENRY ACKERMAN.